(12) United States Patent
Frey

(10) Patent No.: US 9,228,600 B2
(45) Date of Patent: Jan. 5, 2016

(54) PORTABLE WIND-RESISTANT PANEL-FRAME KIT, SYSTEM AND METHOD

(71) Applicant: Moss Holding Company, Elk Grove Village, IL (US)

(72) Inventor: Robert M. Frey, Salt Lake City, UT (US)

(73) Assignee: Moss Holding Company, Elk Grove Village, IL (US)

( * ) Notice: Subject to any disclaimer, the term of this patent is extended or adjusted under 35 U.S.C. 154(b) by 39 days.

(21) Appl. No.: 14/252,785

(22) Filed: Apr. 15, 2014

(65) Prior Publication Data

US 2015/0292537 A1    Oct. 15, 2015

(51) Int. Cl.
  *F16B 5/00*      (2006.01)
  *E04C 2/00*      (2006.01)
  *G09F 15/00*     (2006.01)

(52) U.S. Cl.
  CPC .............. *F16B 5/0004* (2013.01); *E04C 2/00* (2013.01); *G09F 15/0012* (2013.01); *G09F 15/0018* (2013.01); *G09F 15/0025* (2013.01)

(58) Field of Classification Search
  CPC ............ G09F 15/0012; G09F 15/0018; G09F 15/0025
  See application file for complete search history.

(56) References Cited

U.S. PATENT DOCUMENTS

| | | | |
|---|---|---|---|
| 3,302,351 A | | 2/1967 | Trulaske |
| 3,509,673 A | * | 5/1970 | Witkosky et al. ............... 52/242 |
| 3,608,260 A | * | 9/1971 | Eckel et al. ..................... 52/284 |
| 3,830,278 A | | 8/1974 | Packer |
| 3,974,616 A | * | 8/1976 | Beckley ....................... 52/656.1 |
| 4,217,714 A | * | 8/1980 | Ramsay ......................... 40/549 |
| 4,831,804 A | * | 5/1989 | Sayer ........................... 52/475.1 |
| 4,882,866 A | * | 11/1989 | Gebhardt .................. 40/611.01 |
| 4,993,866 A | * | 2/1991 | Sugihara et al. ............. 403/402 |
| 5,245,773 A | * | 9/1993 | Snyder .......................... 40/603 |
| 5,255,466 A | * | 10/1993 | Synder .......................... 40/603 |
| 5,305,567 A | * | 4/1994 | Wittler ........................ 52/238.1 |
| 5,517,779 A | * | 5/1996 | Coleman ........................ 40/603 |
| 5,572,821 A | * | 11/1996 | Coleman ........................ 40/603 |
| 5,678,338 A | * | 10/1997 | Coleman ........................ 40/603 |
| 6,415,568 B1 | * | 7/2002 | Lingenfelder et al. .......... 52/240 |
| 8,015,736 B2 | | 9/2011 | Frey |
| 8,196,326 B2 | | 6/2012 | Frey |
| 8,240,072 B2 | | 8/2012 | Frey |
| 8,627,590 B1 | * | 1/2014 | Whitehead ..................... 40/792 |
| 8,956,071 B2 | * | 2/2015 | Frey .............................. 403/382 |
| 2002/0029504 A1 | * | 3/2002 | Lowndes ........................ 40/603 |
| 2006/0042141 A1 | | 3/2006 | Hansen et al. |
| 2008/0148684 A1 | * | 6/2008 | Bruder ............................ 52/764 |

(Continued)

*Primary Examiner* — Rodney Mintz
(74) *Attorney, Agent, or Firm* — Lance M. Pritikin, Esq.

(57) ABSTRACT

A portable panel-frame construction kit, system and method are described. A multiplicity of elongated frame members are releasably interconnectable to form a wall frame segment having at least one aperture therethrough, wherein facing sides of the frame members are coplanar with one another and at least a pair of the frame members are disposed on opposite sides of the aperture. A gasket channel is formed at the facing side of each frame member. Each gasket channel has a respective insertion axis oriented generally parallel to its respective facing side, and may be formed by fixed engagement between a cladding element and facing side of the respective frame member. A panel member is tautly securable to the wall frame segment by initial stretching of the panel member and insertion of mounting gaskets into respective gasket channels. A pull tab may be provided to facilitate removal of the gaskets from the channels.

11 Claims, 4 Drawing Sheets

(56) References Cited

U.S. PATENT DOCUMENTS

| | | | |
|---|---|---|---|
| 2008/0282591 A1* | 11/2008 | Hill | 40/615 |
| 2010/0077686 A1* | 4/2010 | Bowen | 52/506.06 |
| 2010/0077688 A1* | 4/2010 | Bowen | 52/506.09 |
| 2010/0202827 A1 | 8/2010 | Frey | |
| 2010/0263251 A1* | 10/2010 | Pitcher et al. | 40/778 |
| 2011/0094135 A1* | 4/2011 | Frey | 40/605 |
| 2012/0036755 A1* | 2/2012 | Frey | 40/729 |
| 2014/0259827 A1* | 9/2014 | Breihof | 40/541 |

* cited by examiner

PORTABLE WIND-RESISTANT PANEL-FRAME KIT, SYSTEM AND METHOD

TECHNICAL FIELD

The present invention relates generally to the field of portable display systems. More particularly, the invention concerns portable display systems comprising a framework to which display panels are attached, such as those commonly used for decoration and advertising in retail establishments, trade shows, special events, and the like.

BACKGROUND

Portable display systems incorporating extruded Aluminum frameworks and fabric panel walls are well known. In such systems, the fabric panel wall typically includes a series of gaskets disposed about its periphery, the gaskets being insertable into grooves extending and opening laterally from respective frame members. However, problems may arise when such conventional display systems are used outdoors where the wind can pick up. Wind forces imposed in a direction normal to the fabric panel in conventional systems can result in the perpendicularly-oriented panel gaskets being pulled out of their respective gasket channels. The larger the panel-frame system, the more panel surface area may be exposed to the wind, thereby generating increased forces capable of easily and suddenly dislodging the panel from the frame, even in low to moderate winds. This effectively ruins the commercial value of having an advertising graphic on a frame structure.

What is needed is an improved portable panel-frame system, kit and method which results in a substantially more wind-resistant display structure than previous expedients, while remaining lightweight, inexpensive to produce and quick to assemble and disassemble.

SUMMARY

Certain deficiencies of the prior art may be overcome by the provision of a portable panel-frame construction kit and system comprising a multiplicity of frame members and at least one panel member in accordance with the present invention. Each frame member may be elongated and hollow, and include a substantially constant cross-sectional profile and at least one facing side. The frame members may be releasably interconnectable to form at least a wall frame segment having at least one center aperture therethrough wherein the facing sides are generally coplanar with one another and wherein at least a pair of the frame members are disposed on opposite sides of the aperture. Frame systems in accordance with the present invention are suitable for use to produce large outdoor structures, for example, 4 feet by 4 feet by 12 feet, or larger.

A respective gasket channel is formed at the facing side of each of the oppositely disposed pair of frame members. Each gasket channel typically has a respective channel floor, a channel mouth opposite thereof, and an insertion axis extending from the channel floor to the channel mouth. Each insertion axis may preferably be oriented generally parallel to its respective facing side.

The panel members include a display portion with a panel peripheral edge having at least two mounting gaskets secured on generally opposite sides thereof. Each of the mounting gaskets may have an inboard edge and an outboard edge with respect to the display portion. When the wall frame segment is formed (e.g., assembled), the respective channel mouths are typically oriented generally outwardly from one another and the panel member is tautly securable to the wall frame segment by initial stretching of the panel member and snug insertion of the mounting gaskets into respective gasket channels. The display portion may be preferably comprised of dye sublimated fabric or stretch vinyl with UV-cured inks disposed thereon. In embodiments, the panel members may include a pull tab securely connected to at least a respective one of the mounting gaskets. Moreover, such pull tab may preferably include a graspable loop portion configured to receive, for example, the finger of a user.

Each gasket channel may preferably be formed by fixed engagement between a cladding element and respective facing side of a frame member. This fixed engagement may be achieved, at least in part, by riveting. Each oppositely disposed pair of frame members may further include an outboard lateral side generally perpendicular to its respective facing side. In such case, the cladding elements may be positioned so as not to extend outwardly of their respective lateral side.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
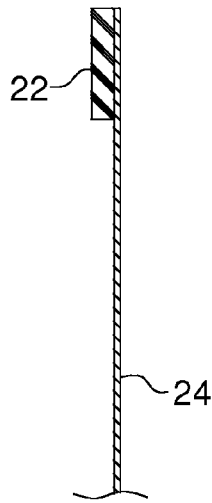
FIG. 1 is a diagrammatic cross-sectional view of a prior art panel member wherein a groove gasket is connected to a flexible fabric display portion.
Figure 2:
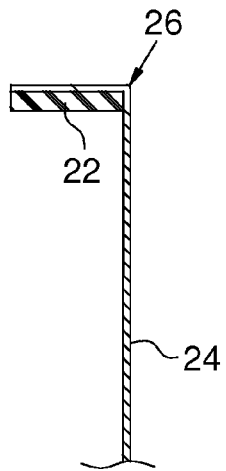
FIG. 2 is a diagrammatic cross-sectional view of the prior art panel member similar to that of FIG. 1, but wherein the gasket is placed at a right-angle with respect to the display portion in preparation for connection of the panel member to the framework in a manner consistent with conventional practices.
Figure 3:
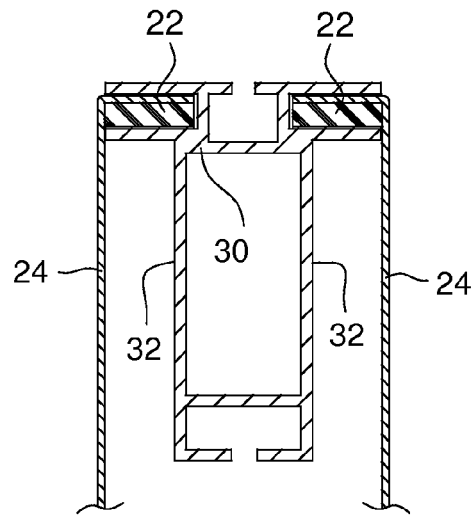
FIG. 3 is a diagrammatic partial cross-sectional view of a prior art panel-frame system incorporating securement of fabric panels to a frame member, wherein the gaskets are inserted into mounting grooves oriented normal to the respective facing side of the frame member as is typical in the conventional art.
Figure 4:
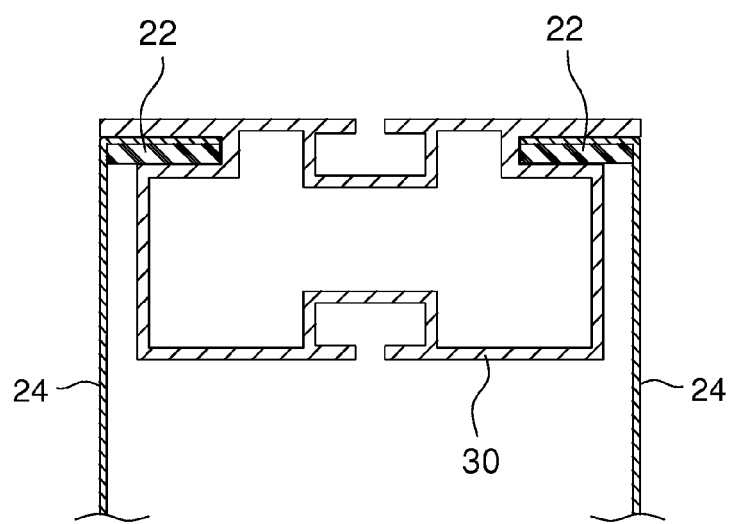
FIG. 4 is a diagrammatic partial cross-sectional view of a further prior art panel-frame system similar to that of FIG. 3.

Referring now to the drawings, like reference numerals designate identical or corresponding features throughout the several views.

Typical prior art expedients are illustrated in FIGS. 1-4. It is well known in the art of portable display systems to construct Aluminum frameworks with extruded frame members 30 having laterally-extending channels, and then attach flexible panels 24 to the framework by inserting respective panel gaskets 22 into the laterally-extending channels. In such expedients, the channels are oriented normal to lateral walls 32 of the frame member 30, while the flexible panels extend generally parallel to the lateral walls 32. Problems arise with such solutions when, for example, the display system is intended to be used outdoors where the wind can suddenly pick up. Wind forces imposed in a direction normal to the flexible panel can result in the perpendicularly-oriented panel gaskets 22 being pulled out of their respective gasket channels. The larger the prior art panel-frame system, the more panel surface area may be exposed to the wind, thereby generating increased forces capable of dislodging the panel from the frame even in low to moderate winds. Partial or complete dislodging of the panel from the frame effectively ruins the commercial value of having an advertising graphic on a frame structure.

Figure 5:
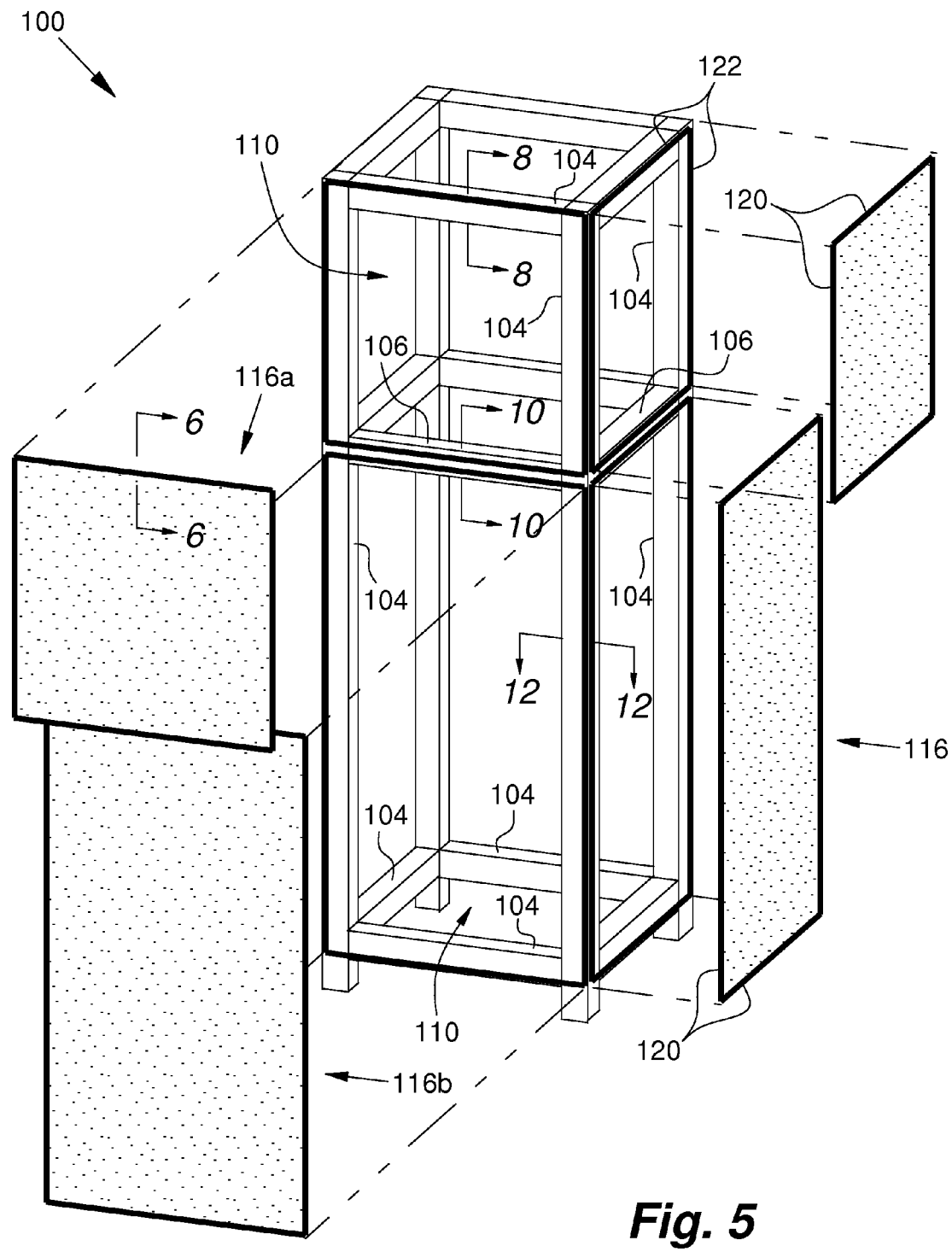
FIG. 5 is a diagrammatic partially exploded view of one non-limiting embodiment of a panel-frame system in accordance with the present invention.
Figure 14:
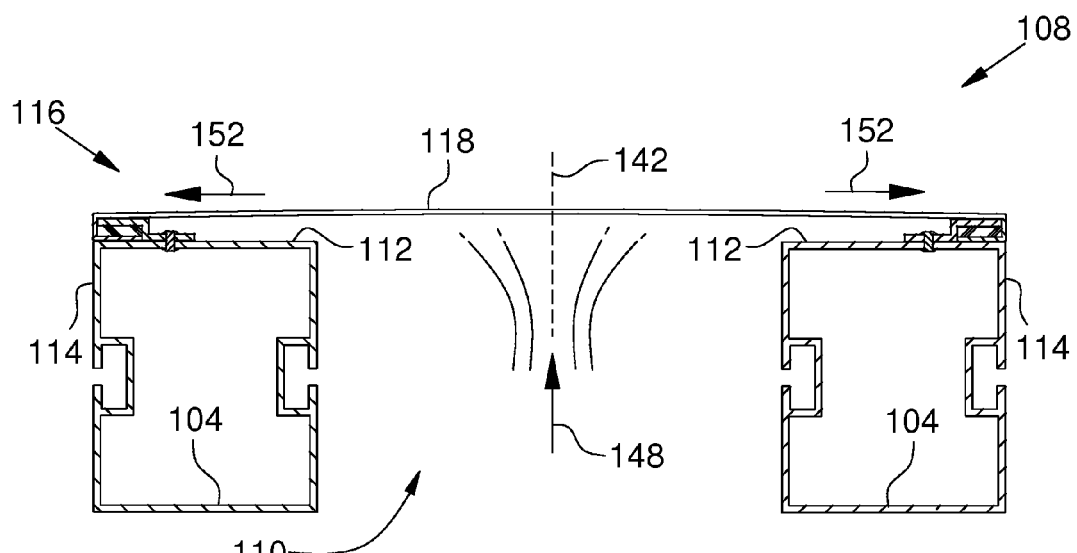
FIG. 14 is a diagrammatic cross-sectional view of a wall frame segment in accordance with one non-limiting embodiment of the present invention, shown with a panel member tautly secured to the wall frame segment across its center aperture in wind-resistant fashion.

With reference to FIGS. 5-15, preferred embodiments of a portable panel-frame construction kit and system in accordance with the present invention may comprise a multiplicity of frame members 104 and/or 106 and at least one panel member 116 (see, for example, system 100 in FIG. 5). Each frame member 104 and 106 may be elongated and hollow, and include a substantially constant cross-sectional profile and a facing side 112. The frame members 104 (and in certain embodiments, 104 and 106) may be releasably rigidly interconnectable with one another to form a wall frame segment. Referring to FIG. 14 for illustration, a wall frame segment 108 may have at least one center aperture 110 therethrough wherein the facing sides 112 are generally coplanar with one another and wherein at least a pair of the frame members 104 are disposed on opposite sides of the aperture 110. The frame members (e.g., those shown at 104 and 106) may be preferably formed of extruded Aluminum alloy.

Referring to FIGS. 8, 10, 12 and 14 for illustration, a respective gasket channel 122 may be formed at the facing side 112 of each of the oppositely disposed pair of frame members 104. Each gasket channel 122 typically includes a respective channel floor 124, a channel mouth 126 opposite thereof, and an insertion axis 128 extending from the channel floor 124 to the channel mouth 126. Each insertion axis 128 is preferably oriented generally (i.e., substantially) parallel to its respective facing side 112.

Figure 6:
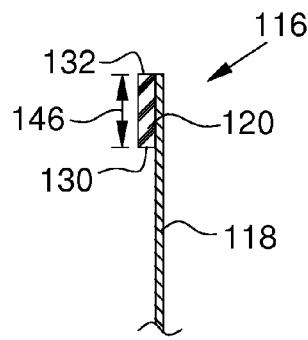
FIG. 6 is a diagrammatic partial cross-sectional view of a panel member in accordance with the present invention, shown in a precursor configuration.
Figure 7:
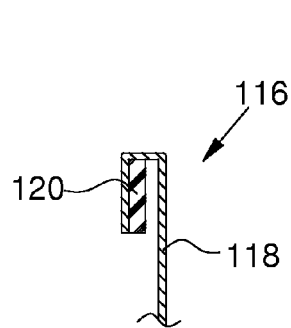
FIG. 7 is a diagrammatic partial cross-sectional view of the panel member of FIG. 6, wherein the mounting gasket has been configured for placement in a gasket channel in accordance with the present invention.
Figure 9:
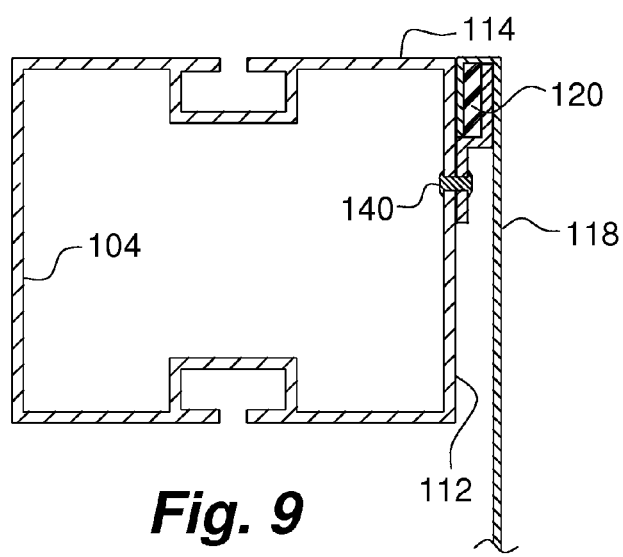
FIG. 9 is a diagrammatic cross-sectional view illustrating the securement of a panel member to a frame member in accordance with a non-limiting embodiment of the present invention.

Referring to FIGS. 6, 7 and 9 for illustration, a panel member 116 may preferably include a display portion 118 with a panel peripheral edge having at least two mounting gaskets 120 secured on generally opposite sides thereof. Each mounting gasket 120 may have an inboard edge 130 and an outboard edge 132 with respect to the display portion 118. Referring again to FIG. 14, when the wall frame segment 108 is formed, the respective channel mouths 126 may preferably be oriented generally outwardly from one another and the panel member 116 is tautly securable to the wall frame segment 108 by way of slightly stretching the display portion 118 and snugly inserting the mounting gaskets 120 into respective gasket channels 122.

Figure 15:
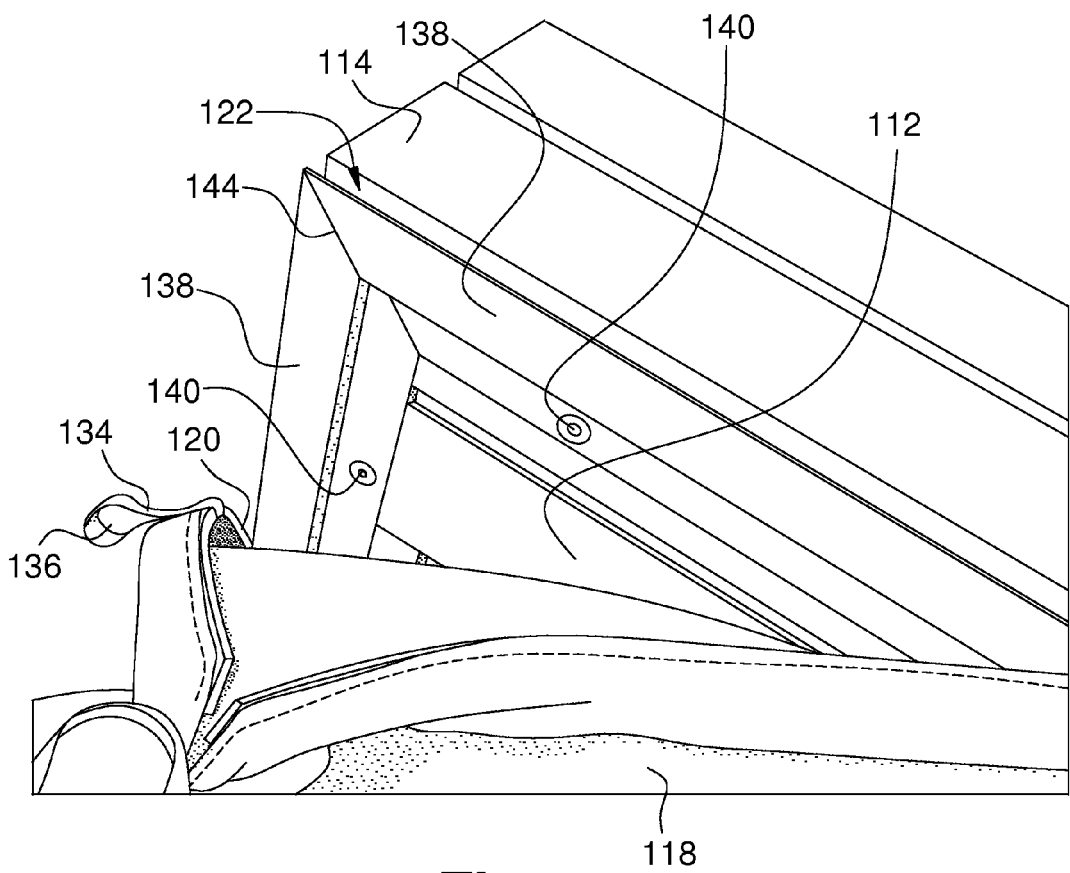
FIG. 15 is a diagrammatic partial perspective view of one example of a portable panel-frame system in accordance with the present invention, wherein the panel member is shown partially removed from the respective gasket grooves.

Referring to FIG. 15, in certain preferred embodiments, a panel member 116 may include a least one pull tab 134 securely connected to, for example, at least a respective one of the mounting gaskets 120. In such embodiments, the connection between the pull tab and gasket may be direct or indirect, but will generally be robust enough to allow the mounting gasket 120 to be repeatedly pulled out of its respective gasket channel 122 by way of its pull tab 134. In certain preferred embodiments, the display portion 118 and pull tab 134 maybe sewn onto their respective mounting gaskets 120. Alternatively or in addition, the pull tab 134 may be sewn to the display portion 118 at a location proximate a receptive mounting gasket 120. In embodiments, the one or more pull tabs 134 may include a graspable loop portion 136. A loop portion 136 may be configured to receive, for example, a finger of a user to facilitate pulling on the pull tab 134. In preferred embodiments, the pull tab is located proximate (e.g., within four inches) of at least one corner of the panel member 116.

Figure 8:
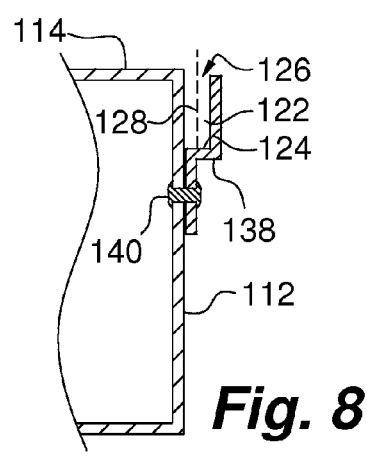
FIG. 8 is a diagrammatic partial cross-sectional view taken across line 8-8 of FIG. 5, and illustrating an embodiment of a frame member and gasket channel in accordance with one embodiment of the present invention, wherein the gasket channel is formed by fixed engagement between a cladding element and respective facing side of the frame member.
Figure 12:
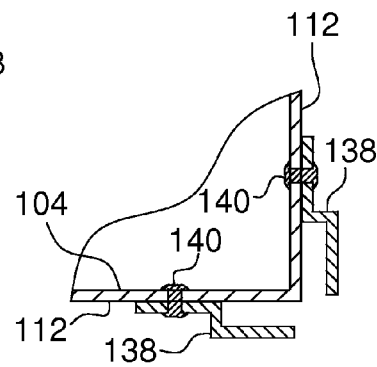
FIG. 12 is a diagrammatic cross-sectional view taken across line 12-12 in FIG. 5, wherein a pair of gasket channels are formed at the junction of two facing sides of the same frame member.
Figure 10:
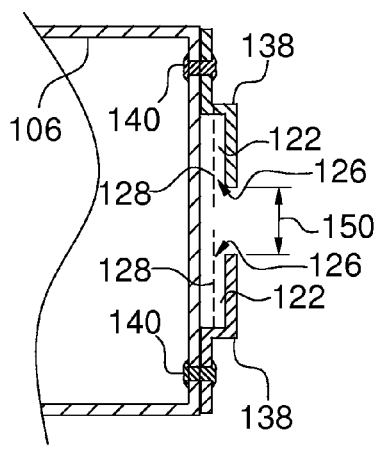
FIG. 10 is a diagrammatic partial cross-sectional view taken across line 10-10 in FIG. 5, illustrating a medial frame member and a pair of corresponding mutually-facing gasket channels in accordance with a non-limiting embodiment of the present invention.

Referring to FIGS. 8, 10 and 12 for example, in particular embodiments, one or more of the gasket channels 122 may be formed by fixed engagement between a cladding element 138 and a respective facing side 112. Depending upon the particular embodiment, such fixed engagement may be achieved, at least in part, by riveting (e.g., as with rivets 140), welding, a combination thereof or the like. The cladding is preferably made of a material similar to that of the frame member to which it is applied such as an Aluminum alloy.

Referring to FIGS. 8, 9 and 14 for example, in certain embodiments of a portable panel-frame construction kit and system, each oppositely disposed pair of frame members 104 may further include an outboard lateral side 114 generally perpendicular to its respective facing side 112. In such embodiments, the cladding elements 138 (or any portion of the channel 122) may be positioned so as to not extend outwardly of their respective outboard lateral side 112.

The display portion 118 in most embodiments will typically be a stretchable fabric material capable of supporting or having printed thereon one or more graphic designs. In particular embodiments of the kit and system described herein, the display portion 118 may be comprised of dye sublimated fabric or the like. In the alternative, a display portion 118 may be comprised of stretch vinyl with UV-cured inks disposed thereon, or the like.

Referring to FIG. 14, in certain embodiments of a portable panel-frame construction system, the multiplicity of frame members 104 may each be releasably interconnected to form a wall frame segment 108 having a center aperture 110 therethrough wherein the facing sides 112 are generally coplanar with one another and the center aperture 110 defines an aperture axis 142. In such embodiments, each gasket channel 122 may have an insertion axis 128 extending from the channel floor 124 to the channel mouth 126, and the channel mouths 126 of the wall frame segment 108 may be oriented generally outwardly of their respective aperture axis 142. At least one panel member 116 includes a display portion 118 with a panel peripheral edge having mounting gaskets 120 secured thereabout. Each mounting gasket 120 is inserted into a respective gasket channel 122, thereby providing taught securement of the panel member 116 to its wall frame segment 108.

In certain embodiments of a portable panel-frame construction system, each gasket channel 122 is formed by fixed engagement between a cladding element 138 and respective facing side 112. As illustrated in FIG. 15 for example, in such embodiments, at least two of the cladding elements 138 may be are mitered to form a beveled joint 144 with one another.

Figure 11:
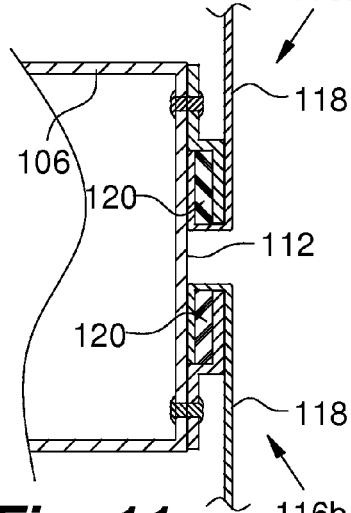
FIG. 11 is a diagrammatic cross-sectional view similar to that of FIG. 10, but showing panel members mounted to respective gasket channels.
Figure 13:
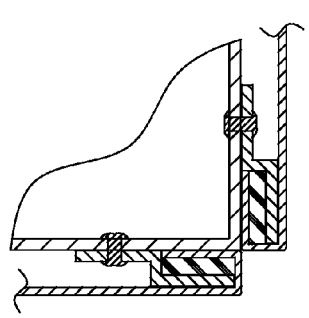
FIG. 13 is a diagrammatic view similar to that of FIG. 12, but wherein each gasket channel has a panel member mounted thereat.

Referring to FIGS. 5, 10 and 11 for illustration, particular embodiments of a portable panel-frame construction kit may comprise a medial frame member 106 being elongated and hollow, and including a substantially constant cross-sectional profile and a facing side 112. The medial frame member 106 may be configured to be releasably interconnected with peripheral frame members (e.g., 104) to form a wall frame segment having at least two center apertures 110 therethrough which are disposed on opposite sides of the respective medial frame member 106. In such embodiments, a pair of gasket channels 122 may be formed at the facing side 112 of the medial frame member 106. Each such gasket channel 122 may have a respective channel floor 124, a channel mouth opposite thereof 126, and an insertion axis 128 extending from the channel floor 124 to the channel mouth 126. As illustrated in FIG. 10, each insertion axis 128 of the medial frame member 106 may be oriented generally parallel to its respective facing side 112 and the channel mouths 126 may be oriented generally toward one another.

Referring to FIGS. 5, 10 and 11 for illustration, in embodiments of a kit having a medial frame member 106, at least two panel members (e.g., first panel member 116*a* and second panel member 116*b*) may be provided. At least one mounting gasket 120 of each of these panel members may be insertable into a respective gasket channel 122 so as to contribute to the taught securement of the panel members (e.g., 116*a* and 116*b*) to the respective dual aperture 110 wall frame segment. Moreover, the mounting gaskets 120 used in association with a medial frame member 106 may have a respective inboard edge 130, outboard edge 132, and gasket width 146 defined therebetween. The channel mouths 126 of the medial frame member may preferably be spaced from one another a distance 150 approximately equal to this gasket width 146. As before, the gasket channels of a medial frame member may also be formed by fixed engagement between a cladding element 138 and its facing side 112.

As illustrated in FIG. 14 for example, embodiments in accordance with the present invention allow for the rapid construction and disassembly of display structures using flexible or fabric panels in tension 152, while substantially improving the wind resistance of the assembled display system against wind forces (as shown for example, at 148). What results is a large portable panel-frame construction kit and system which is inexpensive to manufacture, and much safer for use in the crowded, outdoor trade show environment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A portable panel-frame construction system comprising:
   a multiplicity of frame members, each said frame member being elongated and hollow, and including a substantially constant cross-sectional profile and a facing side, said frame members being releasably interconnected to form a wall frame segment having a center aperture therethrough wherein said facing sides are coplanar with one another and said center aperture defines an aperture axis;
   a respective gasket channel formed at said facing side of each of said frame members, each said gasket channel having a respective channel floor, a channel mouth opposite thereof, and an insertion axis extending from said channel floor to said channel mouth, each said insertion axis being oriented parallel to that insertion axis's respective facing side and said channel mouths being oriented outwardly of said aperture axis, each said gasket channel being formed by fixed engagement between a cladding element and respective said facing side, said fixed engagement being achieved, at least in part, by riveting; and
   a panel member including a display portion with a panel peripheral edge having mounting gaskets secured thereabout, each said mounting gasket being inserted into a respective said gasket channel, thereby providing taught securement of said panel member to said wall frame segment.

2. The portable panel-frame construction system as defined in claim 1 in which at least two of said cladding elements are mitered to form a beveled joint with one another.

3. The portable panel-frame construction system as defined in claim 1 in which said display portion is comprised of dye sublimated fabric.

4. The portable panel-frame construction system as defined in claim 1 in which said display portion is comprised of stretch vinyl with UV-cured inks disposed thereon.

5. The portable panel-frame construction system as defined in claim 1 in which said panel member includes a pull tab securely connected to at least a respective one of said mounting gaskets.

6. The portable panel-frame construction system as defined in claim 5 in which said pull tab includes a graspable loop portion.

7. A portable panel-frame construction kit comprising:
   a multiplicity of frame members, each said frame member being elongated and hollow, and including a substantially constant cross-sectional profile and a facing side, said frame members being releasably interconnectable to form a wall frame segment having a center aperture therethrough wherein said facing sides are coplanar with one another and wherein at least a pair of said frame members are disposed on opposite sides of said aperture;
   a respective gasket channel formed at said facing side of each of said oppositely disposed pair of frame members, each said gasket channel having a respective channel floor, a channel mouth opposite thereof, and an insertion axis extending from said channel floor to said channel mouth, each said insertion axis being oriented parallel to that insertion axis's respective facing side, each said gasket channel being formed by fixed engagement between a cladding element and respective said facing side, said fixed engagement being achieved, at least in part, by riveting; and a panel member including a display portion with a panel peripheral edge having at least two mounting gaskets secured on opposite sides thereof, each said mounting gasket having an inboard edge and an outboard edge with respect to said display portion;

wherein when said wall frame segment is formed, said channel mouths are oriented outwardly from one another and said panel member is tautly securable to said wall frame segment by way of snug insertion of said mounting gaskets into respective said gasket channels.

8. The portable panel-frame construction kit as defined in claim 7 in which said panel member includes a pull tab securely connected to at least a respective one of said mounting gaskets.

9. The portable panel-frame construction kit as defined in claim 8 in which said pull tab includes a graspable loop portion.

10. The portable panel-frame construction kit as defined in claim 7 in which said display portion is comprised of dye sublimated fabric.

11. The portable panel-frame construction kit as defined in claim 7 in which said display portion is comprised of stretch vinyl with UV-cured inks disposed thereon.

\* \* \* \* \*